United States Patent

Bell et al.

[11] Patent Number: 5,892,767
[45] Date of Patent: Apr. 6, 1999

[54] SYSTEMS AND METHOD FOR MULTICASTING A VIDEO STREAM AND COMMUNICATIONS NETWORK EMPLOYING THE SAME

[75] Inventors: Robert T. Bell, Bountiful, Utah; William C. Forsythe; James R. Tighe, both of Frisco, Tex.

[73] Assignee: Selsius Systems Inc., Dallas, Tex.

[21] Appl. No.: 815,192

[22] Filed: Mar. 11, 1997

[51] Int. Cl.[6] .................................................. H04N 7/173
[52] U.S. Cl. ........................ 370/432; 395/200.49; 348/7
[58] Field of Search .................................. 370/270, 395, 370/396, 400, 432, 486; 348/6, 7, 8, 12; 455/3.1, 4.1, 5.1; 395/200.31, 200.33, 200.47, 200.48, 200.49

[56] References Cited

U.S. PATENT DOCUMENTS

| | | | |
|---|---|---|---|
| 5,262,875 | 11/1993 | Mincer et al. | 358/335 |
| 5,361,261 | 11/1994 | Edem et al. | 370/85.3 |
| 5,408,465 | 4/1995 | Gusella et al. | 370/17 |
| 5,442,749 | 8/1995 | Northcutt et al. | 395/200.09 |
| 5,528,282 | 6/1996 | Voeten et al. | 348/7 |
| 5,550,982 | 8/1996 | Long et al. | 395/200.13 |
| 5,581,784 | 12/1996 | Tobagi et al. | 385/826 |
| 5,583,561 | 12/1996 | Baker et al. | 348/7 |
| 5,610,841 | 3/1997 | Tanaka et al. | 345/12 |
| 5,625,405 | 4/1997 | Dulac et al. | 348/7 |
| 5,675,738 | 10/1997 | Suzuki et al. | 395/200.49 |
| 5,748,898 | 5/1998 | Ueda | 395/200.49 |
| 5,781,740 | 7/1998 | Tanaka | 395/200.59 |

*Primary Examiner*—Chi H. Pham
*Assistant Examiner*—Ricky Q. Ngo

[57] ABSTRACT

For use in a communications network having a source and destination endpoint that employs a video transmission protocol in which the destination endpoint of a video stream receives a release command from the source endpoint of the video stream to begin displaying the video stream, the destination endpoint normally receiving the release command only after completion of a capabilities negotiation between the destination endpoint and the source endpoint, a system for, and method of, multicasting the video stream from the source endpoint to at least one destination endpoint. The method includes the steps of: (1) beginning the multicasting of the video stream, (2) ignoring any capabilities messages received from the at least one destination endpoint during the multicasting of the video stream and (3) issuing periodic release commands during the multicasting of the video stream irrespective of receipt times of the ignored capabilities messages, the at least one destination endpoint thereby commanded to begin to display the video stream following a simulation of the capabilities negotiation.

30 Claims, 5 Drawing Sheets

SYSTEMS AND METHOD FOR MULTICASTING A VIDEO STREAM AND COMMUNICATIONS NETWORK EMPLOYING THE SAME

CROSS-REFERENCE TO RELATED APPLICATIONS

This application is related to the following U.S. patents and U.S. patent applications:

| U.S. Pat. No. or Ser. No. | Title | Inventor(s) | Filing Date |
|---|---|---|---|
| 5,594,732 | BRIDGING AND OUT-OF-BAND SIGNALING SUBSYSTEMS AND METHODS FOR A MULTIMEDIA SYSTEM | Robert T. Bell, et al. | March 3, 1995 |
| 5,659,542 | SYSTEM AND METHOD FOR SIGNALING AND CALL PROCESSING FOR PRIVATE AND HYBRID VIDEO/AUDIO COMMUNICATIONS SYSTEMS INCLUDING MULTIMEDIA SYSTEMS | Robert T. Bell, et al. | March 3, 1995 |
| 5,838,683 | DISTRIBUTED INTERACTIVE MULTIMEDIA SYSTEM ARCHITECTURE | Paul S. Hahn, et al. | March 13, 1995 |
| 8/404,191 | MULTIMEDIA CLIENT FOR MULTIMEDIA/HYBRID NETWORK | Ronald D. Higgins, et al. | March 13, 1995 |
| 8/379,365 (ABANDONED) | MULTIMEDIA SYSTEM HAVING CENTRAL POWER SOURCE AND DISTRIBUTION SUBSYSTEM | Richard K. Hunter, et al. | January 27, 1995 |

The above-listed patents and patent applications are commonly assigned with the present invention and are incorporated herein by reference as if reproduced herein in their entirety.

TECHNICAL FIELD OF THE INVENTION

The present invention is directed, in general, to multimedia systems and, more specifically, to a system and method for multicasting a video stream and a communications network that employs the system or method.

BACKGROUND OF THE INVENTION

Currently, "information superhighway" and "multimedia" are probably the most often spoken and least often understood aspects of a coming revolution in data communication. Although issues specific to an information superhighway are beyond the scope of the present discussion, interactive multimedia systems are very much within the present scope.

An interactive multimedia system is broadly defined as a system capable of processing, storing, communicating and coordinating data pertaining to visual information, aural information and other information. Visual information is generally divided into still picture or graphics and full motion video or animation categories. In the vernacular of those involved in multimedia, such visual information is generically referred to as "video." Aural information is generally divided into speech and non-speech categories and is generically referred to as "voice." "Other information" is directed primarily to computer data, often organized in files and records, and perhaps constituting textual and graphical data. Such computer data are generally referred to as "data."

To date, multimedia has, for the most part, been limited to stand-alone computer systems or computer systems linked together in a local area network ("LAN"). While such isolated systems have proven popular and entertaining, the true value of multimedia will become apparent only when multimedia-capable wide area networks ("WANs") and protocol systems are developed, standardized and installed that permit truly interactive multimedia. Such multimedia systems will allow long distance communication of useful quantities of coordinated voice, video and data, providing, in effect, a multimedia extension to the voice-only services of the ubiquitous telephone network.

Fully interactive multimedia presentation of information obviously provides significant advantages in the business environment or otherwise. Consequently, a considerable amount of effort has been directed to delivering multimedia information to the end user. In connection therewith, many organizations are presently engaged in efforts to establish standards and recommendations for the interoperability of multimedia information throughout the communication networks.

For instance, the international community, through the agency of the International Telecommunication Union-Telecommunication sector ("ITU-T"), has been instrumental in the effort of producing guidelines and recommendations that allow multimedia systems from different manufacturers to interoperate with one another. One of the earliest recommendations from the ITU-T is the H.320 videoconferencing series of recommendations. The overview document, ITU-T Recommendation H.320-1993, entitled *Narrow-Band Visual Telephone Systems and Terminal Equipment*, and the related documents, define a set of recommendations that allow distant endpoints to connect together and exchange information over narrow-band channels (up to 1920 kbit/s) and ultimately provide video desktop conferencing and collaboration therebetween. A large number of systems have been developed employing this set of ITU-T recommendations. In conjunction therewith, a follow-up set of documents, ITU-T recommendations H.324-1995, entitled *Terminal for Low Bitrate Multimedia Communication*, were created to handle the distribution of multimedia information over slower communications channels (less than 64 Kbit/s). The aforementioned recommendations and related set of recommendations are incorporated herein by reference. Systems based on the aforementioned and related sets of recommendations are now operative and have achieved a substantial degree of market penetration.

One of the limitations with H.320 or H.324 compatible systems is that such systems are relegated to point-to-point connectivity. More specifically, H.320 or H.324 compatible systems support multimedia communication between two endpoints only. Obviously, it would be desirable in many applications for a source endpoint to communicate multimedia information to multiple destinations. For instance, a presentation by a corporate manager to employees located throughout the country on a new product line or on improvements to existing products would increase the delivery of pertinent information. The present systems requires a multimedia control unit ("MCU") to facilitate the communication from a single source to multiple endpoints. The MCUs allow each of the communications endpoints to establish a point-to-point connection with the MCU and the information is then replicated from the source to the multiple endpoints. For a small number of workstations the MCU approach provides a viable alternative; the MCU approach, however, becomes expensive and computationally infeasible as the number of workstations increases, even modestly. Thus, the use of the MCUs or a similar device in connection with the H.320 or H.324 compatible systems does not provide a viable solution for source to multiple endpoint communication.

Accordingly, what is needed in the art is a system and method that facilitates the communication of multimedia information between interchangeable source and multiple destination endpoints without substantially increasing the overhead of the system employing the same.

SUMMARY OF THE INVENTION

To address the above-discussed deficiencies of the prior art, it is a primary object of the present invention to provide a way of multicasting a video stream within the constraints mandated by a protocol that normally requires a capabilities negotiation to take place between a source endpoint and a destination endpoint before the video stream can be displayed at the destination endpoint.

In the attainment of the above primary object, the present invention provides, for use in a communications network having a source and destination endpoint that employs a video transmission protocol in which the destination endpoint of a video stream receives a release command from the source endpoint of the video stream to begin displaying the video stream, the destination endpoint normally receiving the release command only after completion of a capabilities negotiation between the destination endpoint and the source endpoint, a system for, and method of, multicasting the video stream from the source endpoint to at least one destination endpoint. The method includes the steps of: (1) beginning the multicasting of the video stream, (2) ignoring any capabilities messages received from the at least one destination endpoint during the multicasting of the video stream and (3) issuing periodic release commands during the multicasting of the video stream irrespective of receipt times of the ignored capabilities messages, the at least one destination endpoint thereby commanded to begin to display the video stream following a simulation of the capabilities negotiation.

The present invention therefore introduces the broad concept of multicasting by simulating the capabilities negotiation, such that the destination endpoints are "tricked" into believing that the negotiation has, in fact, taken place.

In an alternative embodiment of the present invention, the video stream is ITU-T H.261/H.263 encoded. For a better understanding of the above-referenced encoding standards see ITU-T Recommendation H.261-1993, entitled Video CODEC for audiovisual services at p×64 kbit/s and ITU-T Recommendation H.263-1996, entitled *Video coding for low bit rate communication*. The aforementioned standards are herein incorporated by reference. These standards, which those skilled in the art well understand, require a capabilities negotiation to take place prior to the video stream being displayed by the destination endpoint. Of course, other encoding standards may be developed in the future that require an initial negotiation. Such other standards are fully within the broad scope of the present invention.

In an alternative embodiment of the present invention, the video stream is arranged into ITU-T H.221/H.223 frames. Likewise, these standards, which those skilled in the art well understand, require a capabilities negotiation to take place prior to the video stream being displayed by the destination endpoint. Of course, other framing standards may be developed in the future that require an initial negotiation and are thus fully within the broad scope of so the present invention.

In an alternative embodiment of the present invention, the at least one destination endpoint is in a freeze picture state prior to receiving one of the multiple release commands. Those skilled in the art are familiar with a freeze picture state and its relationship to a release command. The present invention preferably operates invisibly with respect to the destination endpoints. Thus, their operation preferably does not change.

In an alternative embodiment of the present invention, the at least one destination endpoint is released to display the video stream at different times during the multicasting of the video stream. Therefore, it is not necessary that the destination endpoints joined the multicast simultaneously. Each of the destination endpoints is free to join at any time; each simply perceives that it is joining at the beginning. With a large number of destination endpoints, each time the source endpoint issues a release command, a group of destination endpoints join the multicast. Of course, the destination endpoints can join simultaneously, as the broad scope of the present invention encompasses simultaneous joining.

In an alternative embodiment of the present invention, the communications network is selected from the group consisting of: (1) an Asynchronous Transfer Mode (ATM) network, (2) a Private Switched Network and (3) a Public Switched Network. Those skilled in the art will understand, however, that the present invention may be practiced within other environments.

In an alternative embodiment of the present invention, the release command is contained within a logical data channel of a frame transmittable through the communications network. Those skilled in the art are familiar with circuit switched networks and frame protocols employable therein. The present invention is fully employable in, but is not limited to, such networks.

In an alternative embodiment of the present invention, the video stream is created in real time. Of course, the video stream may be stored in and retrieved from memory or well-known information storage media, such as video tape.

In an alternative embodiment of the present invention, the method is performed be executing a sequence of executable software instructions. In a related, but alternative embodiment, the method is embodied, at least in part, as executable code and stored in a storage device. In the embodiment to be illustrated and described, multimedia personal computers can be used as source or destination endpoints. Of course, the destination endpoints can employ dedicated hardware to display the video stream. Thus, the method and system of the present invention may be embodied in software, hardware, firmware or any combination thereof. The broad scope of the present invention is not limited to a particular embodiment.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

While the systems and methods of the present invention will hereinafter be described in a specific environment, the foregoing embodiment is set forth for illustrative purposes only. Of course, other embodiments of the present invention employable in other network infrastructures are well within the broad scope of the present invention. Those skilled in the art should understand that other communications network topologies, and combinations of networks, are equally applicable as environments within which the present invention may operate.

Figure 1:
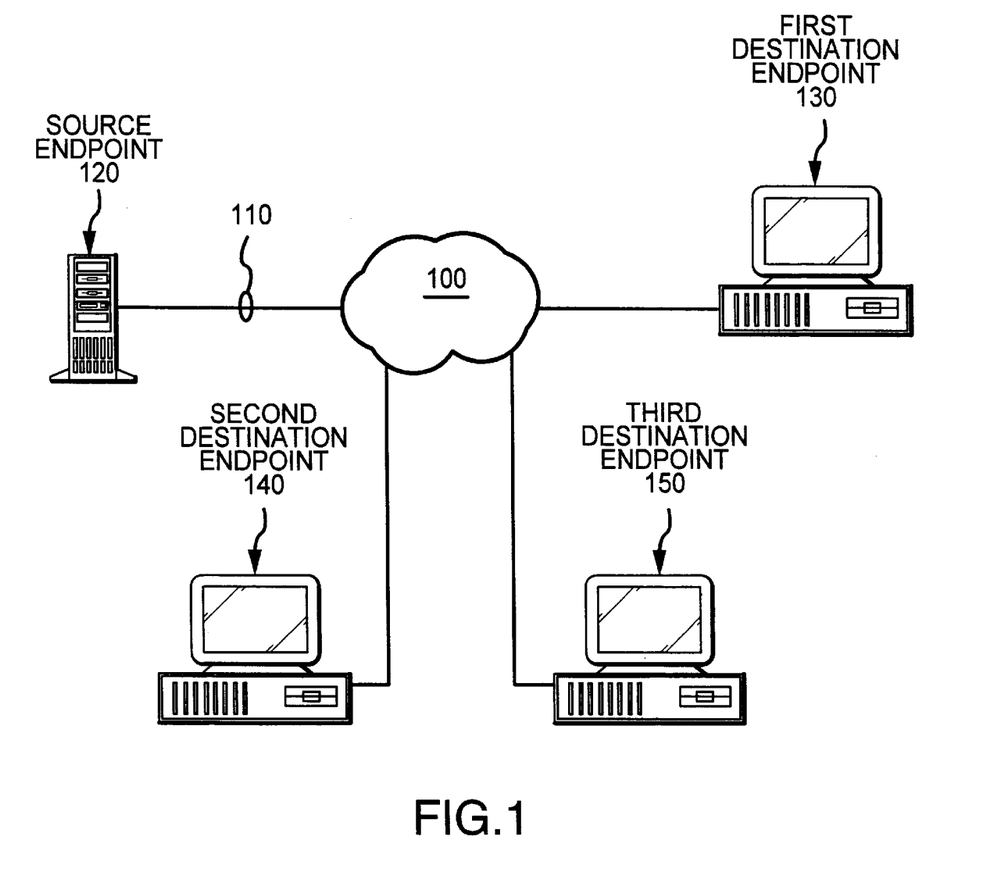
FIG. 1 illustrates a block diagram of a representative communications network that provides an environment for the operation of a system constructed according to the principles of the present invention.

Referring initially to FIG. 1, illustrated is a block diagram of a representative communications network (e.g., the Public Switched Network) 100 that provides an environment for the operation of a system constructed according to the principles of the present invention. Those skilled in the art should understand that other communications network topologies, and combinations of networks, are equally applicable as environments within which the present invention may operate. The communications network 100 includes a plurality of endpoints coupled together via a distribution system 110 for video stream communication thereamong; the plurality of endpoints are capable of being alternatively designated as source endpoints or as destination endpoints. In the illustrated embodiment, the endpoints are designated as follows: (1) a source endpoint 120 and (2) first, second and third destination endpoints 130, 140, 150, respectively. While the source endpoint 120 and the first, second and third endpoints 130, 140, 150 are multimedia personal computer workstations, other communication devices are well within the broad scope of the present invention.

Figure 2:
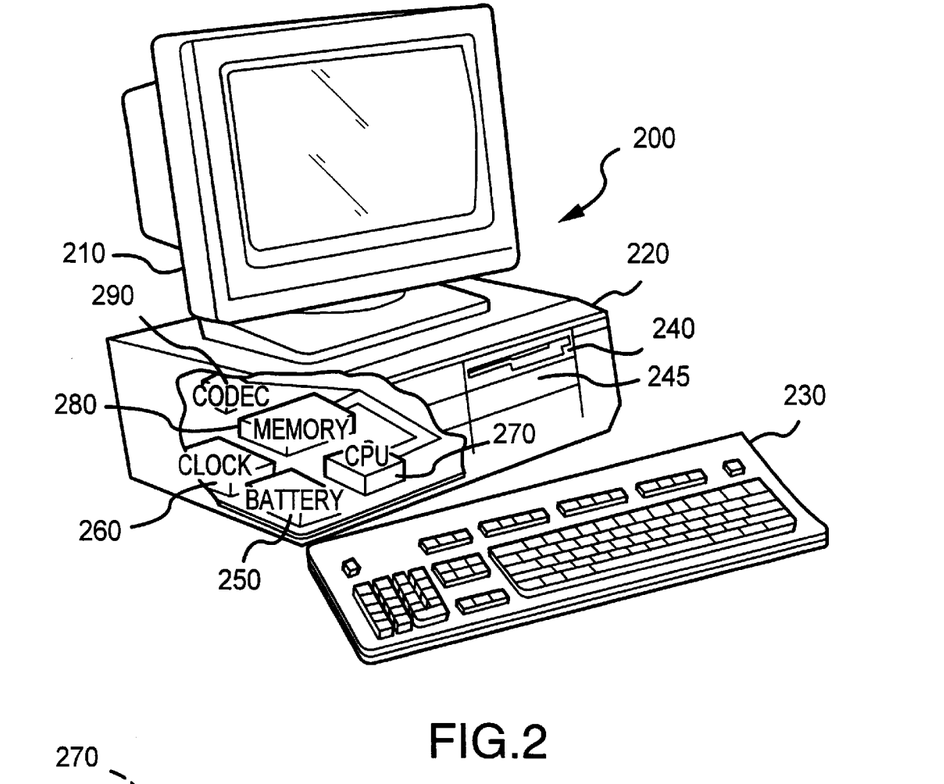
FIG. 2 illustrates an isometric view of an embodiment of a programmable general purpose computer constructed according to the principles of the present invention.

Turning now to FIG. 2, illustrated is an isometric view of an embodiment of a programmable general purpose computer 200 constructed according to the principles of the present invention. The computer 200 may serve as a source or destination endpoint in the communications network 100 of FIG. 1. Since the present invention is not limited to application in a general purpose computer environment, however, FIG. 2 is presented only for illustrative purposes.

The computer 200 includes a monitor or display 210, a chassis 220 and a keyboard 230. The monitor 210 and the keyboard 230 cooperate to allow communication (e.g., via a graphical user interface, or "GUI") between the computer 200 and the user. Alternatively, the monitor 210 and keyboard 230 may be replaced by other conventional input/output devices, respectively. The chassis 220 includes both a floppy disk drive 240 and hard disk drive 245. The floppy disk drive 240 is employed to receive, read and write to removable disks; the hard disk drive 245 is employed for fast access storage and retrieval, typically to a nonremovable disk. The floppy disk drive 240 may be replaced by or combined with other conventional structures to receive and transmit data and instructions, including without limitation, tape and compact disc drives, telephony systems and devices (including videophone, paging and facsimile technologies), and serial and parallel ports.

The chassis 220 is illustrated having a cut-away portion that includes a battery 250, clock 260, processor 270 (e.g., Intel® Pentium® processor), memory 280 and video CODEC 290. Although the computer 200 is illustrated having a single processor 270, hard disk drive 245 and memory 280, the computer 200 may be equipped with a plurality of processors and peripheral devices.

It should be noted that any conventional computer system having at least one processor that is suitable to function as a general purpose computer may replace, or be used in conjunction with, the computer 200, including, without limitation: hand-held, laptop/notebook, mini, mainframe and supercomputers, including RISC and parallel processing architectures, as well as within computer system/network combinations. Of course, special purpose machines having special purpose hardware or dedicated embedded computer systems may also be employed in the system of the present invention. For instance, a special purpose machine may be employed to act as a source of a multimedia stream of information. Alternative computer system embodiments may be firmware-or hardware-based.

Before undertaking more detailed discussions of advantageous embodiments of the present invention, the meaning of the following terms and phrases should be understood: the term "or" is inclusive, meaning and/or; the terms "include," "includes" or "including" mean inclusion without limitation; the phrase "associated with" and derivatives thereof may mean to include within, interconnect with, contain, be contained within, connect to or with, couple to or with, be communicable with, juxtapose, cooperate with, interleave, be a property of, be bound to or with, have, have a property of, or the like; and the phrase "memory map" and derivatives thereof may mean a method by which a computer translates between logical and physical address space, and vice versa.

Figure 3:
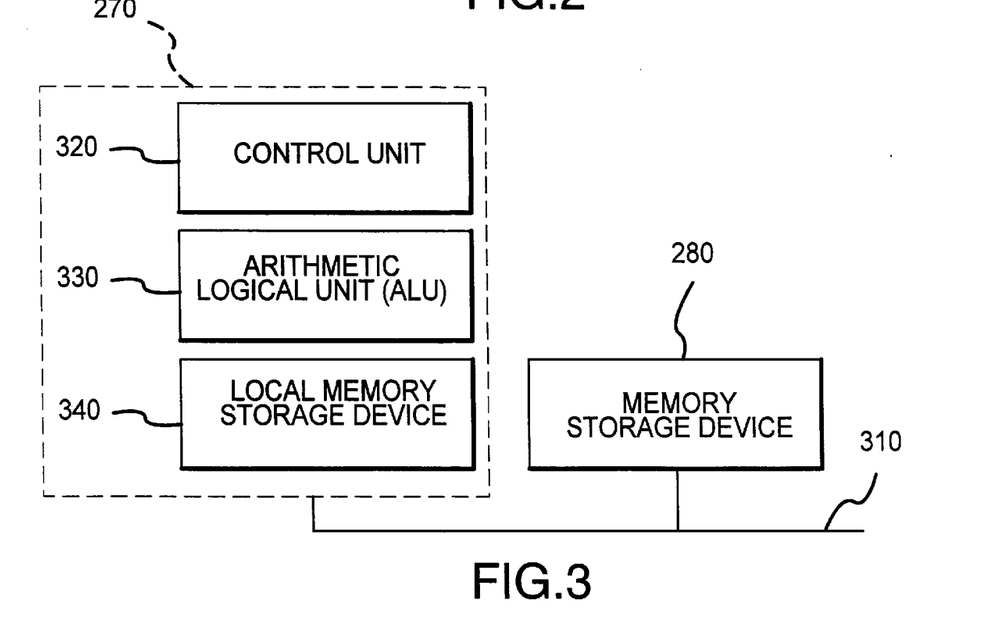
FIG. 3 illustrates a block diagram of an embodiment of the processor associated with the general purpose computer of FIG. 2.

Turning now to FIG. 3, illustrated is a block diagram of an embodiment of the processor 270 associated with the general purpose computer 200 of FIG. 2. The processor 270 is coupled to the memory 280 by a data bus 310. The memory 280 generally stores data and instructions that the processor 270 uses to execute the functions necessary to operate the computer 200. The memory 280 may be any conventional memory storage device. The processor 270 includes a control unit 320, arithmetic logic unit ("ALU") 330 and local memory 340 (e.g., stackable cache or a plurality of registers). The control unit 320 fetches the instructions from memory 280. The ALU 330, in turn, performs a plurality of operations, including addition and boolean AND, necessary to carry out the instructions fetched from the memory 380. The local memory 340 provides a local high speed storage location for storing temporary results and control information generated and employed by the ALU 330.

In alternate advantageous embodiments, the processor 270 may, in whole or in part, be replaced by or combined with any suitable processing configuration, including multi and parallel processing configurations, programmable logic devices, such as programmable array logic ("PAL") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like, to form the various types of circuitry, controllers and systems described and claimed herein.

It should be noted also that while the processor 270 includes the bus configuration as illustrated, alternate configurations are well within the broad scope of the present invention. Furthermore, conventional computer system architecture is more fully discussed in *The Indispensable PC Hardware Book*, by Hans-Peter Messmer, Addison Wesley (2nd ed. 1995) and *Computer Organization and Architecture*, by William Stallings, MacMillan Publishing Co. (3rd ed. 1993); conventional computer, or communications, network design is more fully discussed in *Data Network Design*, by Darren L. Spohn, McGraw-Hill, Inc. (1993) and conventional data communications is more fully discussed in *Voice and Data Communications Handbook*, by Bud Bates and Donald Gregory, McGraw-Hill, Inc. (1996), *Data Communications Principles*, by R. D. Gitlin, J. F. Hayes and S. B. Weinstein, Plenum Press (1992) and *The Irwin Handbook of Telecommunications*, by James Harry Green, Irwin Professional Publishing (2nd ed. 1992). Also, conventional electronic circuit design is more fully discussed in *The Art of Electronics*, by Paul Horowitz and Winfield Hill, Cambridge University Press, 2nd Ed. (1989). Each of the foregoing publications is incorporated herein by reference for all purposes.

In one embodiment of the present invention, the system and method for multicasting a video stream is embodied, at least in part, as executable (e.g., object) code, stored in the memory storage device 280, executed, at least in part, by the processor 270 and displayed on the monitor 210. In connection therewith, an operating system and associate driver circuitry that enables use of a video transmission protocol by the source and destination to endpoints in accordance with the system of the present invention is embodied, at least in part, as executable code, stored in the memory storage device 280 and executed in the processor 270.

Figure 4:
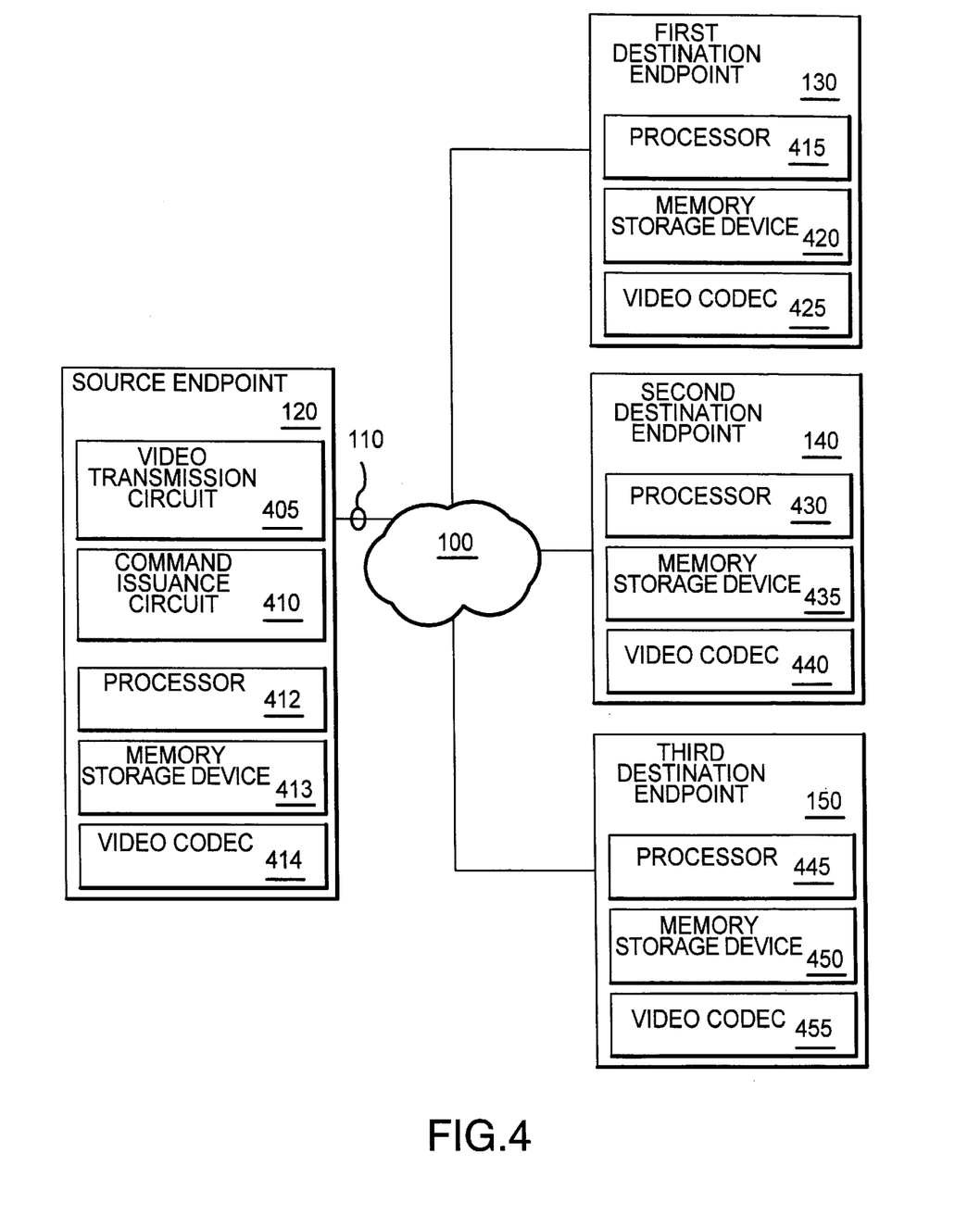
FIG. 4 illustrates a simplified block diagram of the communications network of FIG. 1 including a system constructed according to the principles of the present invention.

Turning now to FIG. 4, illustrates a simplified block diagram of the communications network 100 of FIG. 1 including a system constructed according to the principles of the present invention. The source endpoint 120 includes a video transmission circuit 405, a command issuance circuit 410, a processor 412, a memory storage device 413 and a video CODEC 414. The first, second and third destination endpoints 130, 140, 150 each include a processor 415, 430, 445, respectively, a memory storage device 420, 435, 450, respectively, and a video CODEC 425, 440, 455, respectively. As previously mentioned, the endpoints 120, 130, 140, 150 may be alternatively designated as source endpoints or as destination endpoints by including the circuits disclosed in the source endpoint 120 in the destination endpoints 130, 140, 150. The aforementioned elements all make-up part of a representative system constructed according to the principles of the present invention.

The source and destination endpoints 120, 130, 140, 150 employ a video transmission protocol in which the destination endpoints 130, 140, 150 of a video stream receives a release command from the source endpoint 120 of the video stream to begin displaying the video stream. The destination endpoints 130, 140, 150 normally receive the release command only after completion of a capabilities negotiation between the destination endpoints 130, 140, 150 and the source endpoint 120. The system multicasts the video stream from the source endpoint 120 to the destination endpoints 130, 140, 150 by employing the following components. The video transmission circuit 405 begins multicasting the video stream and the source endpoint 120 ignores any capabilities messages received from the destination endpoints 130, 140, 150 during the multicasting of the video stream. In the illustrated embodiment, the video output of the source endpoint 120 is looped back to itself such that the video CODEC 414 is satisfied with regard to the capabilities exchange thereby allowing the video transmission circuit 405 to ignore the incoming capabilities messages from the destination endpoints 130, 140, 150. The command issuance circuit 410 issues periodic release commands during the multicasting of the video stream irrespective of receipt times of the ignored capabilities messages; the destination endpoints 130, 140, 150 are thereby commanded to begin to display the video stream following a simulation of the capabilities negotiation. The processor 415, 430, 445, memory storage device 420,435, 450, and the video CODEC 425, 440, 455 cooperate at the respective destination endpoints 130, 140, 150 to, among other things, perform the capabilities messages and display the video stream. An operating system and associate driver circuitry (embodied as a sequence of executable instructions stored in the memory storage devices 420, 435, 450 and executed within the respective processors 415, 430, 445 in the present embodiment) enables use of a video transmission protocol by the endpoints. The processors 415, 430, 445 act upon the respective video CODECs 425, 440, 455 to display the video stream.

Those skilled in the art should further understand that, while the present invention is illustrated primarily as embodied in hardware, alternative embodiments include those based in software, firmware or combinations thereof. Such embodiments may include implementations using conventional processing circuitry such as, without limitation, programmable logic arrays ("PLAs"), digital signal processors ("DSPs"), field programmable gate arrays ("FPGAs"), and application specific integrated circuits ("ASICs").

Figure 5:
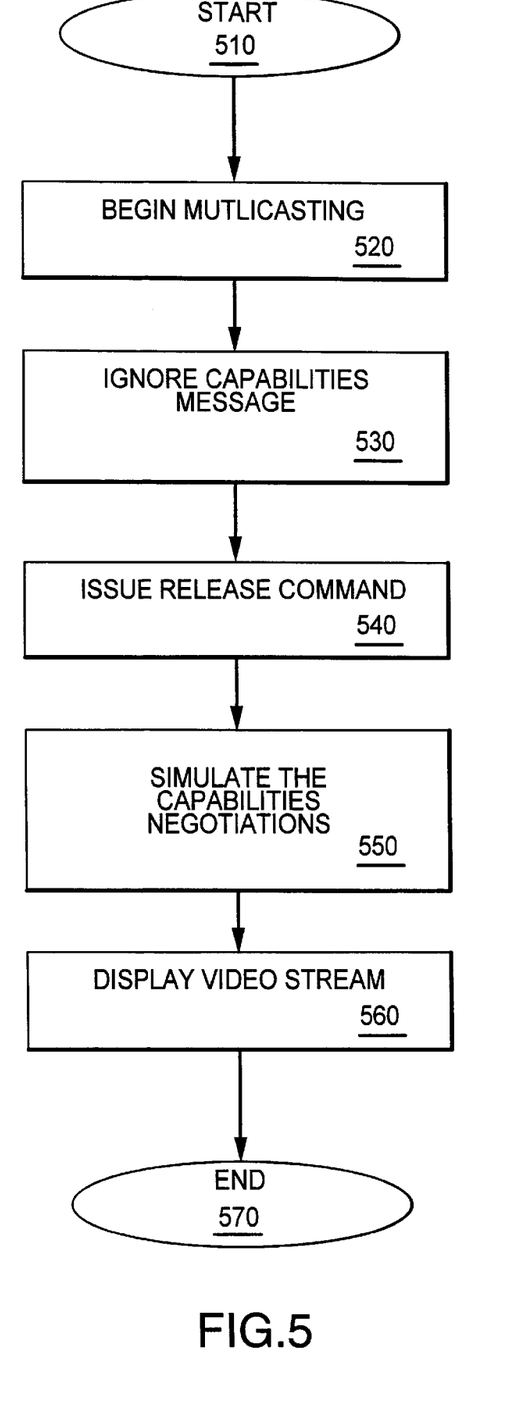
FIG. 5 illustrates a flow diagram of an embodiment of a method according to the principles of the present invention.

Turning now to FIG. 5, illustrated is a flow diagram of an embodiment of a method according to the principles of the present invention. The following method employs the communications network and system as introduced with respect to FIGS. 1 and 4. The method of multicasting the video stream from the source endpoint to the destination endpoints commences at a start step 510. The source and destination endpoints employ a video transmission protocol in which the destination endpoints of the video stream receive a release command from the source endpoint of the video stream to begin displaying the video stream; the destination endpoints normally receive the release command only after completion of a capabilities negotiation between the destination endpoint and the source endpoint.

The source endpoint begins multicasting the video stream at a begin multicasting step 520. The video stream may be ITU-T H.261/H.263 encoded or employ other encoding standards and recommendations depending on the communications protocol employed. Simultaneously, the source endpoint ignores any capabilities messages received from the destination endpoints during the multicasting of the video stream at an ignore capabilities message 530. The source endpoint issues periodic release commands during the multicasting of the video stream irrespective of receipt times of the ignored capabilities messages at an issue release command step 540. Prior to receiving the release commands, the destination endpoints may be in a freeze picture state. The capabilities negotiation is simultaneously simulated at a simulate the capabilities negotiation step 550. The destination endpoints thereby are commanded to begin to display the video stream following the simulation of the capabilities negotiation at a display video stream step 560. Of course, the destination endpoints may be released to display the video stream at different times during the multicasting of the video stream. Additionally, the video stream may be created in real time.

The method terminates at an end step 570. The method, therefore, facilitates the communication of multimedia information between interchangeable source and multiple destination endpoints.

Figure 6:
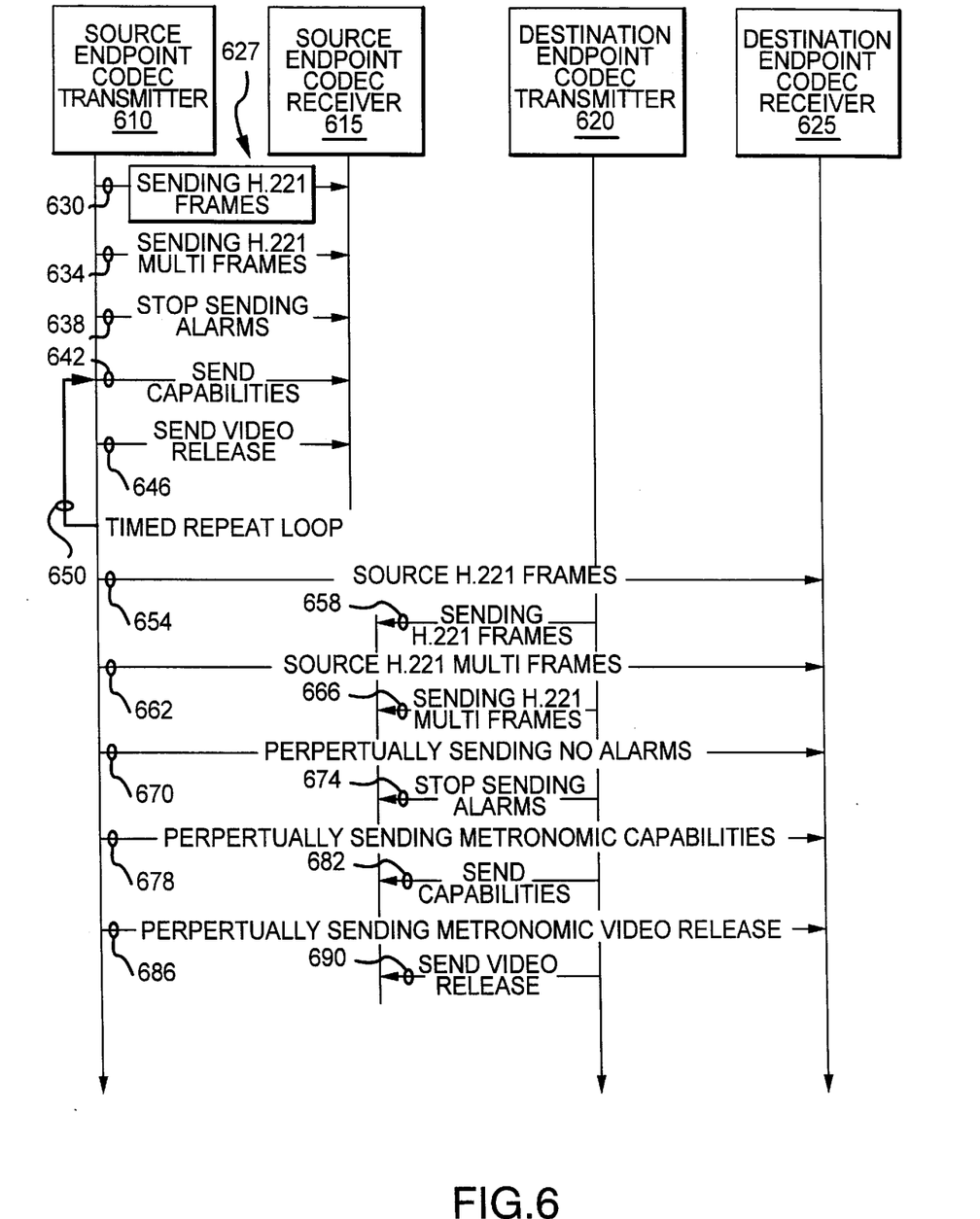
FIG. 6 illustrates a flow diagram of an embodiment of the message negotiation for multicasting a video stream from a source endpoint to a plurality of destination endpoints.

Turning now to FIG. 6, illustrated is a flow diagram of an embodiment of the message negotiation for multicasting a video stream from a source endpoint to a plurality of destination endpoints. The flow diagram illustrates the message negotiation employing a source endpoint CODEC transmitter and receiver 610, 615 and a destination endpoint CODEC transmitter and receiver 620, 625. The first set of messages physically loop the source endpoint CODEC transmitter and receiver 610, 615 such that the received call may be simulated.

The message negotiation begins with the source endpoint CODEC transmitter 610 sending an H.221 frame 627 including the video information to the source endpoint CODEC receiver 615 in a message designated 630. For a detailed illustration of the ITU-T H.221 frame format, see ITU-T Recommendation H.221-1996, entitled *Frame Structure for a 64 to 1920 kbit/s channel in audio visual teleservices* and for the ITU-T H.223 frame format see ITU-T Recommendation H.221-1996, entitled *Multiplexing protocol for low bit rate multimedia communication*. The aforementioned references are incorporated herein by reference. Of course, the above referenced frame formats and communication protocols are submitted for illustrative purposes only.

After the H.221 frame is detected, the message negotiation continues with the source endpoint CODEC transmitter 610 sending multiple H.221 frames including the video information to the source endpoint CODEC receiver 615 in a message designated 634. After the multiple H.221 frames are detected, the message negotiation continues with the source endpoint CODEC transmitter 610 sending a stop sending alarm message 638 to the source endpoint CODEC receiver 615. If no alarms are detected, the message negotiation continues with the source endpoint CODEC transmitter 610 sending a capabilities message 642 to the source endpoint CODEC receiver 615. Once the capabilities are detected, the message negotiation continues with the source endpoint CODEC transmitter 610 sending a video release message 646 to the source endpoint CODEC receiver 615. The messages (such as the release message) may be contained within a logical data channel of the H.221 frame. The metronomic transmission of capabilities and video release along with the perpetual transmission of valid framing with no alarms set signifies that the source endpoint is prepared to continue the multicasting of the video information. A timed repeat loop 650 insures that the capabilities exchange between the source endpoint CODEC transmitter and receiver 610, 615 remains current.

Thereafter, a time circuit switched call is established and the video information is multicast to the destination endpoints including the destination endpoint as illustrated in the present embodiment. It should be noted, however, that the destination endpoints outbound stream designated for the source endpoint remains logically unconnected at this time. The message negotiation proceeds with the source endpoint CODEC transmitter 610 sending an H.221 frame including the video information to the destination endpoint CODEC receiver 625 in a message designated 654. The destination endpoint CODEC transmitter 620 then sends an H.221 frame to the source endpoint CODEC receiver 615 in a message designated 658.

After the H.221 frames are detected, the source endpoint CODEC transmitter 610 sends multiple H.221 frames including the video information to the destination endpoint CODEC receiver 625 in a message designated 662. The destination endpoint CODEC transmitter 620 then sends multiple H.221 frames to the source endpoint CODEC receiver 615 in a message designated 666. After the multiple H.221 frames are detected, the source endpoint CODEC transmitter 610 perpetually sends no alarm messages 670 to the destination endpoint CODEC receiver 625. The destination endpoint CODEC transmitter 620 sends a stop sending alarm message 674 to the source endpoint CODEC receiver 615. If no alarms are detected, the message negotiation continues with the source endpoint CODEC transmitter 610 perpetually sending metronomic capabilities message 678 to the destination endpoint CODEC receiver 625. The destination endpoint CODEC transmitter 620 sends a capabilities message 682 to the source endpoint CODEC receiver 615. Once the capabilities are detected, the message negotiation continues with the source endpoint CODEC transmitter 610 perpetually sending a metronomic video release message 686 to the destination endpoint CODEC receiver 625. The destination endpoint CODEC transmitter 620 sends a video release message 690 to the source endpoint CODEC receiver 615. The information from the destination endpoints bound for the source endpoint is not connected to the CODEC receiver 615. The destination endpoints (including the CODEC receivers) are satisfied by the simulated full duplex, but truly simplex negotiation.

As previously mentioned, the receipt of the capabilities and video release messages is typically necessary to satisfy that a valid full duplex connection is established. The capabilities and video release messages are normally sent when a new capability is requested or near the beginning of a true full duplex connection sequence. Since the multicast is a simplex connection, the destination CODECs normally would not be satisfied even though the streaming data frames are valid. Therefore, the periodic transmission (or burst of transmissions after each multicast receiver joins the broadcast) of capabilities and video release messages emanating from the source endpoint deceive the destination endpoints into believing that a full duplex exchange is ongoing.

Again, the message negotiation is one representative embodiment for multicasting a video stream from a source endpoint to a plurality of destination endpoints and other embodiments capable of simulating the capabilities negotiation to facilitate the multicast of video information are well within the broad scope of the present invention.

Although the present invention and its advantages have been described in detail, those skilled in the art should understand that they can make various changes, substitutions and alterations herein without departing from the spirit and scope of the invention in its broadest form.

What is claimed is:

1. For use in a communications network having a source and destination endpoint that employs a video transmission protocol in which said destination endpoint of a video stream receives a release command from said source endpoint of said video stream to begin displaying said video stream, said destination endpoint normally receiving said release command only after completion of a capabilities negotiation between said destination endpoint and said source endpoint, a method of multicasting said video stream from said source endpoint to at least one destination endpoint, to comprising the steps of:

beginning said multicasting of said video stream;

ignoring any capabilities messages received from said at least one destination endpoint during said multicasting of said video stream; and     issuing periodic release commands during said multicasting of said video stream irrespective of receipt times of said ignored capabilities messages, said at least one destination endpoint thereby commanded to begin to display said video stream following a simulation of said capabilities negotiation.

2. The method as recited in claim 1 wherein said video stream is ITU-T H.261/H.263 encoded.

3. The method as recited in claim 1 wherein said video stream is arranged into ITU-T H.221/H.223 frames.

4. The method as recited in claim 1 wherein said at least one destination endpoint is in a freeze picture state prior to receiving one of said release commands.

5. The method as recited in claim 1 wherein said at least one destination endpoint is released to display said video stream at different times during said multicasting of said video stream.

6. The method as recited in claim 1 wherein said communications network is selected from the group consisting of:

an Asynchronous Transfer Mode (ATM) network;

a Private Switched Network; and a Public Switched Network.

7. The method as recited in claim 1 wherein said release command is contained within a logical data channel of a frame transmittable through said communications network.

8. The method as recited in claim 1 wherein said video stream is created in real time.

9. The method as recited in claim 1 wherein said method is performed be executing a sequence of executable software instructions.

10. The method as recited in claim 1 wherein said method is embodied, at least in part, as executable code and stored in a storage device.

11. For use in a communications network having a source and destination endpoint that employs a video transmission protocol in which said destination endpoint of a video stream receives a release command from said source endpoint of said video stream to begin displaying said video stream, said destination endpoint normally receiving said release command only after completion of a capabilities negotiation between said destination endpoint and said source endpoint, a system for multicasting said video stream from said source endpoint to at least one destination endpoint, comprising:

a video transmission circuit that begins said multicasting of said video stream, said source endpoint ignoring any capabilities messages received from said at least one destination endpoint during said multicasting of said video stream; and     a command issuance circuit that issues periodic release commands during said multicasting of said video stream irrespective of receipt times of said ignored capabilities messages, said at least one destination endpoint thereby commanded to begin to display said video stream following a simulation of said capabilities negotiation.

12. The system as recited in claim 11 wherein said video stream is ITU-T H.261/H.263 encoded.

13. The system as recited in claim 11 wherein said video stream is arranged into ITU-T H.221/H.223 frames.

14. The system as recited in claim 11 wherein said at least one destination endpoint is in a freeze picture state prior to receiving one of said release commands.

15. The system as recited in claim 11 wherein said at least one destination endpoint is released to display said video stream at different times during said multicasting of said video stream.

16. The system as recited in claim 11 wherein said communications network is selected from the group consisting of:

an Asynchronous Transfer Mode (ATM) network;

a Private Switched Network; and a Public Switched Network.

17. The system as recited in claim 11 wherein said release command is contained within a logical data channel of a frame transmittable through said communications network.

18. The system as recited in claim 11 wherein said video stream is created in real time.

19. The system as recited in claim 11 wherein said at least one destination endpoint employs a processor and storage device to display said video stream.

20. The system as recited in claim 11 wherein said system is embodied, at least in part, as executable code, stored in a storage device and executed in a processor.

21. A communications network, comprising:

a distribution system;

a plurality of endpoints coupled together via said distribution system for video stream communication thereamong, said plurality of endpoints capable of being alternatively designated as source endpoints or as destination endpoints; and     an operating system and associate driver circuitry that enables use of a video transmission protocol by said source and destination endpoints in which said destination endpoint of a video stream receives a release command from said source endpoint of said video stream to begin displaying said video stream, said destination endpoint normally receiving said release command only after completion of a capabilities negotiation between said destination endpoint and said source endpoint, said operating system and associate driver circuitry, comprising:

a video transmission circuit, associated with said source endpoint, that begins said multicasting of said video stream over said distribution system, said source endpoint ignoring any capabilities messages received from potential destination endpoints during said multicasting of said video stream; and         a command issuance circuit that issues periodic release commands during said multicasting of said video stream irrespective of receipt times of said ignored capabilities messages, multiple destination endpoints thereby commanded to begin to display said video stream following a simulation of said capabilities negotiation, said video transmission circuit and said command issuance circuit thereby cooperating to allow multicasting of said video stream from said source endpoint to said multiple destination endpoints.

22. The communications network as recited in claim 21 wherein said video stream is ITU-T H.261/H.263 encoded.

23. The communications network as recited in claim 21 wherein said video stream is arranged into ITU-T H.221/H.223 frames.

24. The communications network as recited in claim 21 wherein said multiple destination endpoints are in a freeze picture state prior to receiving one of said release commands.

25. The communications network as recited in claim 21 wherein said multiple destination endpoints are released to display said video stream at different times during said multicasting of said video stream.

26. The communications network as recited in claim 21 wherein said communications network is selected from the group consisting of:

an Asynchronous Transfer Mode (ATM) network;

a Private Switched Network; and a Public Switched Network.

27. The communications network as recited in claim 21 wherein said release command is contained within a logical data channel of a frame transmittable through said communications network.

28. The communications network as recited in claim 21 wherein said video stream is created in real time.

29. The communications network as recited in claim 21 wherein said multiple destination endpoints employ a processor and storage device to display said video stream.

30. The communications network as recited in claim 21 wherein said operating system and associate driver circuitry is embodied, at least in part, as executable code, stored in a storage device and executed in a processor.

* * * * *